United States Patent

Maalouf et al.

[11] Patent Number: 5,156,181
[45] Date of Patent: Oct. 20, 1992

[54] REMOVABLE SEATS FOR A DUAL POPPET VALVE

[75] Inventors: Jason G. Maalouf, Mishawaka, Ind.; Eric L. Zelmer, Buchanan, Mich.

[73] Assignee: Allied-Signal Inc., Morristown, N.J.

[21] Appl. No.: 733,574

[22] Filed: Jul. 22, 1991

[51] Int. Cl.$^5$ .................. F16K 11/065; F16K 43/00
[52] U.S. Cl. .................. 137/315; 137/625.35; 251/363
[58] Field of Search .............. 137/315, 625.27, 625.35; 251/360, 363

[56] References Cited

U.S. PATENT DOCUMENTS

| | | | |
|---|---|---|---|
| 2,731,036 | 1/1956 | Hughes | 251/363 |
| 2,832,371 | 4/1958 | LaBour | 137/625.35 |
| 2,886,283 | 5/1959 | Natho | 251/363 |
| 4,487,222 | 12/1984 | Crawford | 251/363 |
| 4,892,320 | 1/1990 | Tuckmantel | 251/214 |
| 4,966,193 | 10/1990 | De Campos | 137/625.35 |
| 5,022,436 | 6/1991 | Portolese | 137/625.35 |

FOREIGN PATENT DOCUMENTS 835448  3/1952  Fed. Rep. of Germany ...... 251/363

Primary Examiner—George L. Walton
Attorney, Agent, or Firm—Leo H. McCormick, Jr.; Larry J. Palguta; Robert A. Walsh

[57] ABSTRACT

A balanced dual poppet valve for a fluid control device having a housing removable seats. Each valve seat has a cylindrical body with a flange thereon which engages a flexible member made of laminated graphite and retained in the housing to form a seal between the cylindrical body and housing while at the same time creating a defined radial clearance therebetween. A locking ring connected to the housing holds the cylindrical body in the housing and prevents the seats from rotating within the housing. The flexible member positions the cylindrical body within the radial clearance to maintain the alignment of conical seating surfaces on the cylindrical body with each seat with dimensional changes in the housing as a result of temperature changes to assure that flow communication from the entrance port to the outlet port terminates when an actuator moves the cylindrical body to an inoperative position.

6 Claims, 3 Drawing Sheets

REMOVABLE SEATS FOR A DUAL POPPET VALVE

This invention relates to removable seats for a housing of a balanced dual poppet valve in a fluid control device. Each valve seat has a cylindrical body with a flange thereon which engages a flexible member to form a seal between the cylindrical body and housing. A locking ring connected to the housing holds the cylindrical body in the housing and prevents the seats from rotating within the housing. A resilient member located between the cylindrical body and housing allows the conical seating surfaces on the removable seats to remain aligned and seated with a correspondent poppet valve with changes in the concentricity of the housing to assure that flow communication from the entrance port to the outlet port terminates when the actuator moves the dual poppet valves to an inoperative position.

In the operation of an aircraft fuel system it is not unusual for fluid supplied to the operational controls to vary in temperature and pressure. In an effort to protect sealing surfaces from wear caused by the flow of fluid, various seating surfaces protection schemes have been employed. In U.S. Pat. No. 3,934,612 ceramic and carbon pads are disclosed to provide long service for such a fuel valve while in U.S. Pat. No. 3,198,481 particular surfaces on the seals are positioned to reduce seal erosion. In order to assure that no leakage occurs across a closed valve it has been disclosed in U.S. Pat. No. 4,232,695 to sequentially close series poppet valves to reduce flow to zero and eliminate internal leakage. When the physical size of a valve is relatively small, the prior art valves operate in a satisfactory manner, however when a large volume of operating fluid is required the operation of such valves requires considerable actuation force to maintain stability.

U.S. Pat. No. 5,022,436 discloses a typical balance dual poppet valve wherein a cylindrical member is connected to an actuation member. The cylindrical body has a first end with a first poppet having a segment of a parabolic curve extending from a peripheral surface and a second end with a second poppet having a segment of a parabolic curve extending the peripheral surface. The body of the valve has a cavity or bore with an entrance port connected to a source of fluid and an outlet port connected to a fluid system. The cylindrical body is located in cavity or bore and moved by an actuation member to control the communication of fluid between the entrance port and outlet port. The space relationship between the first poppet and a first seat and the second poppet and a second seat establishes the rate at which the fluid flows to the outlet port. The interior of the bore adjacent the second end of the cylindrical body has a parabolic shape such that the path of the fluid flow from the second poppet is reversed and directed through the center of the cylindrical body. The quantity of fluid which flows past the second seat is combined with the quantity of fluid which flows past the first seat to meet the fluid demand by the positioning of the cylindrical body by the actuation member. The fluid pressure in the fluid that is presented to the bore acts on the first and second poppets in both the static and actuation state to establish substantially equal forces to create a balance valve and as a result only minimum actuation force is required to move the cylindrical body and establish the required fluid flow from the entrance port to the outlet port.

U.S. Pat. No. 4,966,193 discloses a dual poppet valve wherein the second poppet interrupts the flow of fluid past the second seat prior to the interruption of the flow of fluid past the first seat. A sleeve member concentric to the cylindrical body has a bearing section that is located in a groove adjacent the second end of the cylindrical body The sleeve member has a curved surface that extends from the flange and forms an extension for the segment of the parabolic curve that extends from the second end of the cylindrical body. A flexible member located in the groove on the cylindrical body acts on the bearing section of the sleeve member to urge the sleeve member toward a stop or the wall of the groove in the cylindrical body. When the actuation member moves the cylindrical body to initiate flow from the entrance port to the outlet port, the bearing of the sleeve member engages the stop or bottom of the groove such that the curved section on the sleeve forms a continuation of the segment of the parabolic surface on the second end of the cylindrical body. The sleeve surrounds the flexible member and protects the flexible member from erosion and damage as the fluid flows between the parabolic surface and second seat. When the actuation member moves the cylindrical body toward the rest position, where flow is terminated between the entrance port and outlet port, the curved section of the sleeve initially contacts the second seat to interrupt flow through the second poppet. As the actuation member moves the cylindrical body closer to the rest position, the resilient member is compressed between the sleeve and cylindrical body to form a seal to prevent internal leakage from the source into the bore. When the first poppet engages the first seat, the second poppet has already been seated and all flow from the source of fluid under pressure to the fluid system terminates.

The dual poppet valves in U.S. Pat. Nos. 4,966,193 and 5,022,436 operate in as satisfactory to control the flow of fuel from a source to an engine. The pressure in the fuel can vary from 0 to 1000 psi while the temperature can also vary from −250° to 1540° F. After the housing of such valves are attached to an engine they may undergo changes in eccentricity of the first and second valve seats that are part of the housing due to either thermal expansion or yield in the metal of the housing caused by external loading. When such changes occur, the first and second valve seats may become eccentric and as a result a leak could result when the dual poppet valve are seated during an inoperated state.

In the present invention, the first and second valve seats are designed to float to compensate for such changes in the concentricity of the housing. In this dual poppet valve each of the first and second seats has a cylindrical member located in the flow cavity of the housing with a flexible member located in a groove in the housing to separate the cylindrical member from the housing A locking disc connected to the housing engages a flange on the cylindrical member to compress the flexible member and form a seal between the cylindrical member and the housing. The flexible member allows dimensional changes to occur in the housing without effecting the conical surface on the cylindrical member to assure that the corresponding first or second poppets are seated to completely interrupt the flow of fluid through the cavity to the outlet port when the actuation member is in the inoperative position.

It is an object of this invention to provide a balanced dual poppet valve having first and second valve seats that can move to compensate for concentricity in the valve housing.

It is a further object of this invention to provide a dual poppet valve with first and second seats that may be removed and replaced after an extended period of use to match seating surfaces with corresponding poppet members.

It is a still further object of this invention to provide a dual poppet valve with first and second valve seats that can move to compensate for changes in the concentricity of a flow cavity caused by external loads or thermal expansion to assure that the flow cavity is completed sealed from a source of fuel.

Advantages that this invention provides over the known valves resides in the ability to remove the first and second valve seats and replaced with new valve seat while retaining the valve housing, the ability of the first and second seats to remain concentric with corresponding poppet members even though the housing may experience some eccentricity and the use of locking rings to retain the first and second seats in the housing rather than use screws which may cause stress concentrations to adversely effect the strength of the housing.

These objects and advantages should be apparent from reading this specification while viewing the drawings wherein.

Figure 1:
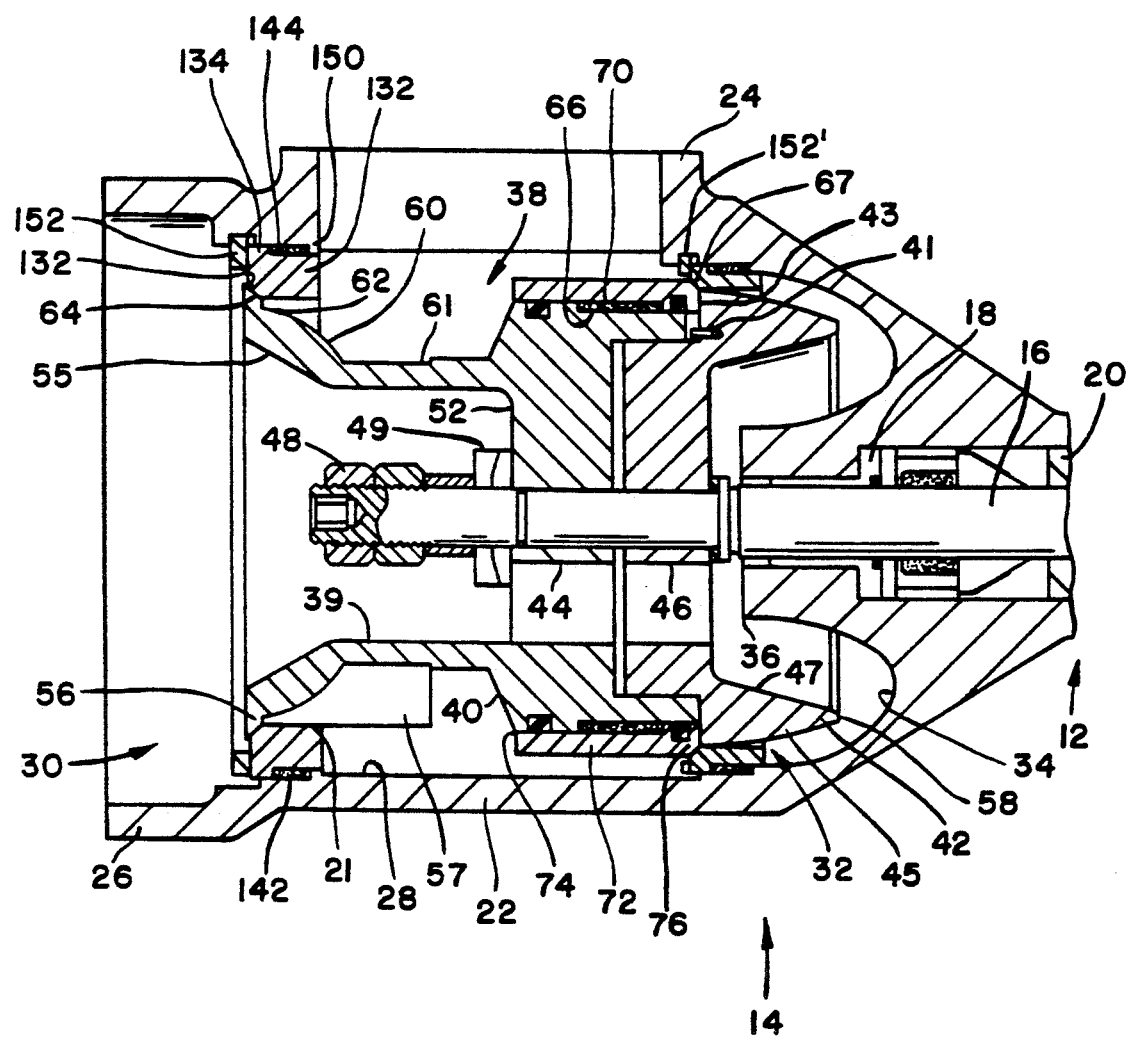
FIG. 1 is a schematic illustration of a sectional view of a valve incorporating the teachings of this invention.

A fuel flow control device 10 is shown in FIG. 1 of the type disclosed in U.S. Pat. No. 4,966,193 which has an actuation section 12 connected to a valve section 14 for supplying high temperature fuel from a source to an engine. The actuation section 12 includes shaft seals 20, an actuation shaft or rod 16 and an actuator which is not shown. The actuation shaft or rod 16 extends through bearing member 20 located in bore 18 in the housing 22 of the valve section 14. In response to an input from the actuator, hot or cold fluid under pressure from a source flows through an entrance port 24 to an outlet port 26 connected to a conduit which supplies the engine with operational fuel.

In more particular detail, the housing 22 of valve section 14 has a cavity or bore 28. The housing 22 has a first annular seat 30 and a second annular seat 32. The entrance port 24 being located between the first and second annular seats 30 and 32. The housing 22 has a curved surface 34 which extends from the second seat 32 to an annular section 36 that surrounds bore 18. The curved surface 34 is substantially a parabola and is selected to reverse the flow of fluid that flows past seat 32 toward the outlet port 26 without the creation of turbulence.

Figure 3:
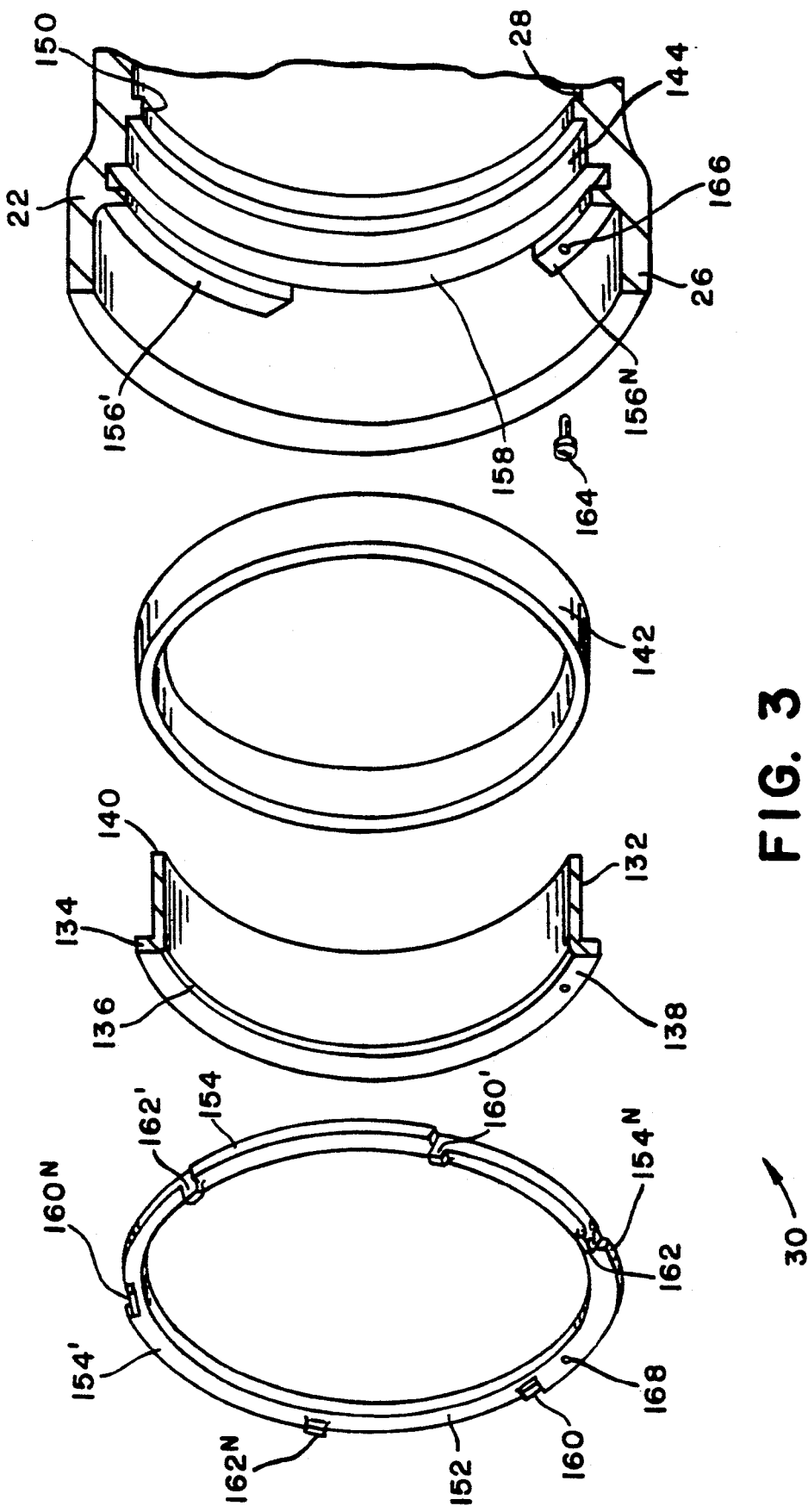
FIG. 3 is enlarged perspective view of a portion of a seat for the valve of FIG. 1.

The first and second annular seats 30 and 32 are designed to be independent and separate from the housing 22 which permits removal and if necessary replacement. In addition, the first and second annular seats 30 and 32 may be manufactured from a different material than the housing 22 to resist wear. Since the first and second annular seats are similar in construction with the only exception being that the first annular seat 30 is larger than and installed in the housing 22 after the second annular seat 32, only the first annular seat 30, as shown in FIG. 3, will be described in specific detail. The individual components of the second annular seat 32 will be identified in the drawings with the same number as the first annular seat 30 plus an "'".

The first annular seat 30 has a cylindrical member 132 with a first end 138 and a second end 140. The first end 138 has a flange 134 with a conical surface 136 thereon. A flexible member 142, which is made of a laminated graphite, is located in a groove 144 in the housing 22. The flexible member 142 has a slightly larger thickness that the dimensional difference between the groove 144 and the peripheral surface 146 on the cylindrical member 132. After the flexible member 142 is located in groove 144, the second end 140 of the cylindrical member 132 is inserted in bore 28 to radially compress the flexible member 142. It should be understood that a radial clearance of approximately 0.010 inches exists between peripheral surface 146 and rib 150 on housing 22 to allow for any dimensional differences that may be present in the housing 22 as a result of thermal expansion or structural stresses. The flexible member 142 allows the cylindrical member 132 to be radially aligned within bore 28 on engagement with the face on the poppets of the body of cylindrical member 38. A locking ring 152 having a plurality of tabs 154, 154' ... $154^N$ tabs is placed in bore 28. A force is applied to end 138 on the cylindrical member 132 to axially compress the flexible member 142 which forms a seal between the peripheral surface 146 on cylindrical member 132 and groove 144 of housing 22. Thereafter, ring 152 is inserted in bore 28 and brought into engagement with shoulder 158 on housing 22. A rotative twist applied to tangs 160, 162 move tabs 154, 154' ... $154^N$ into engagement with corresponding ribs 156, 156' ... $156^N$ in housing 22 to retain the cylindrical member 132 in housing 22.

In order to assure that the locking ring 152 does not move in the housing 22, ends tangs 160, 162 on each tab 152, 152' ... $152^N$ are bent into engagement with ribs 156, 156' ... $156^N$ prevent further rotation. Under some circumstances, locking ring 152 may be made stationary in housing 22, by a pin 164 which passes through opening 166 in rib $156^N$ and opening 168 in tab $154^N$. Pin 164 could have threads on the head thereof which match threads in rib $156^N$ or when a roll pin is used frictional engagement is sufficient to hold the pin in housing 22.

After the first and second annular seats 30 and 32 are secured to housing 22, a cylindrical body 38 which carries the dual poppets is located in bore 28. The cylindrical body 38 has a first section 40 and a second section 42 which are located in bore 28. Actuation rod 16 passes through center hub 44 in the first section 40 and center hub 46 in the second section 42 and after self aligning washers 49 are placed on the actuation rod 16, a nut 48 is attached thereto. A guide pin 41 extending from face 67 aligns the internal flow paths in the first and second sections 40 and 42. As nut 48 is tightened, hub 46 is brought into contact with shoulder 50 on actuation rod 16 such that a unitary structure is created. Under certain conditions, it may be necessary to add shims 51 between shoulder 50 and hub 46 to make sure that the first and second poppets are seated before the actuation member has moved the cylindrical body 38 to the rest position. Further, the first section 40 has a plurality of guide bearings 57 (only one is shown) engage surface 21 to maintain the cylindrical body 38 in the axial center of the cavity or bore 28. Center hubs 44 and 46 have a series of radial spokes 52, (only one is shown), that radially extend to the interior of the cylindrical body 38. The cylindrical body 38 has a first end 56 and a second end 58. Cylindrical body 38 has a smooth bore 39 with an annular flared section 55 adjacent the first end 56. The peripheral surface of the cylindrical body 38 includes a first curved surface 60 that extends from a relative constant diameter surface 61 to a shoulder 62. The peripheral surface 64 of the shoulder 62 forming a face that engages seat 30 to form a first poppet and seat seal The first section 40 of the cylindrical body 38 also has a groove 66 on the peripheral surface that extends to the face 67 on the end thereof. Face 43 on the end of the second section 42 forms the end wall for groove 66. The second section 42 has a peripheral curved surface 45 that extends from end 58 to face 43 and an interior curved surface 47 that extends from end 58 to spokes 52. Curved surface 45 is essentially in the shape of a parabola and curved 47 are concentric to the parabolic surface 34 in housing 22. Thus, the interior of housing 22 and the second end 58 of the cylindrical body 38 are shaped to reduce turbulence in flow of fluid that passes around the second poppet.

Prior to the joining of the first section 40 with the second section 42, a flexible member 70 is located in groove 66. The flexible member 70 must be capable of withstanding varying temperature changes that occur in the supply fluid and still function in an intended manner of sealing while possessing resiliency. While many materials may possess these characteristics for this operation it has been found that laminated graphite functions the best.

A sleeve member 72 concentric to surface 74 on the peripheral surface of the first section 40 of cylindrical body 38 surrounds and protects the flexible member 70 from direct contact with fluid supplied to the entrance port 24 to bore 28. A flange 76 on the sleeve member 72 which extends into groove 66 has a curved surface 78 that radially extends from the end face of flange 76. The curved surface 78 forming a face that engages seat 32 to form a second poppet and seat seal.

Figure 2:
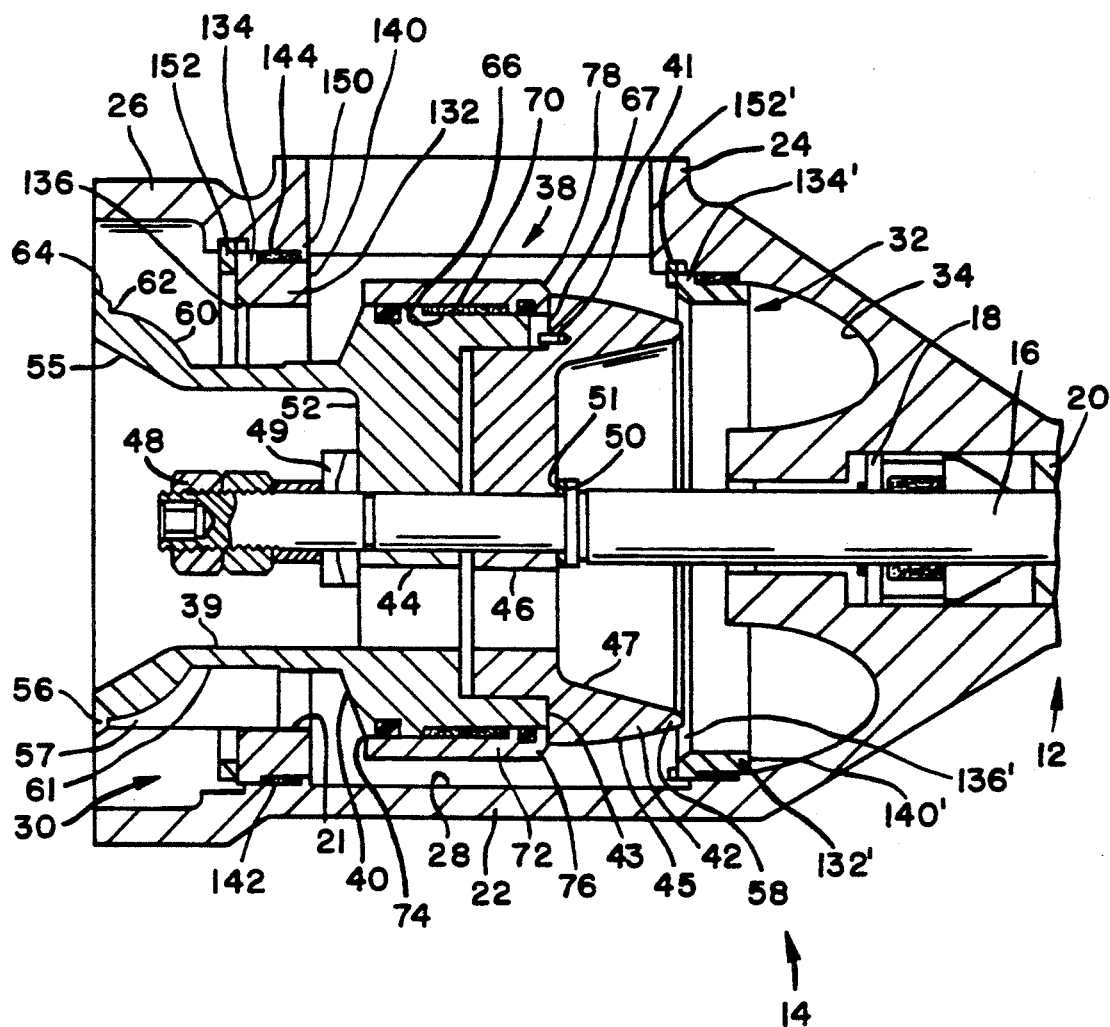
FIG. 2 is a schematic illustration of the valve of FIG. 1 showing a space relationship of the first and second seats and corresponding first and second poppet members which permits fluid to flow from an entrance port to an outlet port.

In operation an input force from the actuator moves the actuation push rod 16 which in turn moves the cylindrical body 38 to move face 64 on the first poppet away from seat 30 and allow fluid to flow directly from the entrance port 24 to the outlet port 26 in a manner as shown in FIG. 2. The space relationship between curved surface 60 and seat 30 defines an area for first volume or quantity of fluid to directly flow past the first seat 30 to the outlet port 26. At the same time, a second volume or quantity of fluid flows past the second poppet to the interior of the cylindrical body 38. As the cylindrical body 38 is moved to an operation position as shown in FIG. 2, the resilient member 70 acts on the flange 76 to bring the same into engagement with a stop or face 43 on the second section 42. The curved surface 45 on the second section of the cylindrical body 38 forms a smooth transition for the flow of fluid from bore 28 to the interior of the cylindrical body 38. The space relationship between the curved surface 45 and face 32 defines an area for a volume or quantity of fluid to flow past the second seat 32 to the interior of the cylindrical body 38. The curved surface 34 on housing 22 and curved surface 47 on the second section 42 of the cylindrical body 38 directs the second quantity of fluid to the interior bore 39 without the creation of substantial turbulence. As the second quantity fluid flows from bore 39, flare 55 allows the second quantity of fluid to be combined with the first quantity of fluid without the creation of turbulence. The first and second quantities of fluid are thereafter presented to the outlet port 26 for distribution to the fluid system to meet the demand as indicated by the position of the actuator. During the flow of fluid past the second seat 32, sleeve member 72 protects the flexible member 70 from erosion and deterioration that could occur should the fluid directly contact the flexible member 70. This flow of fluid from the entrance port 24 continues in accordance with the position of the cylindrical body 38 within bore 28. The volume of fluid is changed with movement of the cylindrical body 38 because of the relationship of the curved surface 60 with seat 30 and curved surface 45 with seat 32 to meet new or different fluid requirements as a new inputted signal is supplied to the actuator.

When the demand of fluid as inputted to the actuator terminates, the actuator moves the actuation shaft or rod 16 and cylindrical body 38, which carries the first and second poppets, toward the closing or rest position, as shown in FIG. 1. Since the fluid pressure acts on substantially the same area of the first and second poppets, the force to move the cylindrical body 38 is relatively small. As the cylindrical body 38 approaches the rest position, the curved surface 78 on sleeve member 72 of the second poppet engages seat 32 to terminate the flow of fluid past seat 32 into the interior flow path through bore 39 while a small volume of direct flow to outlet port 26 continues to occur past seat 30. Further movement of cylindrical body 38 toward the rest position causes sleeve 72 to slide on surface 74 of the cylindrical body 38 and compress the flexible member 70 such that a seal occurs between the sleeve 72 and groove 66 to prevent fluid from leaking into the interior of the cylindrical body 38. Flexible member 70 continues to be compressed until surface 64 on the first poppet engages seat 30 and flow from the entrance port 24 to the outlet port 26 terminates.

The resilient members 142, 142' located between housing 22 and the cylindrical members 132, 132' allows for some radial movement to assure that the conical surfaces remain engaged with surfaces 64 and 78, respectively to assure that flow of fuel through bore 28 is completely terminated without leakage when the actuator shaft or rod is in the inoperative position.

It may be necessary to refurbish the control device 10 after an extended period of use, however the housing 22 can easily be reconditioned through the replacement of the first and second annular seats 30 and 32.

The dual poppet valve 10 disclosed herein provides a fluid system with stability and low actuation forces while accurately supplying high temperature fuel fluid to the components in the fluid system. This dual poppet valve provides a weight reduction over known state of the art valves for fluid systems wherein varying temperatures and large volumes of fluid must be supplied within relative short time periods.

I claim:

1. In a valve having a housing with a cavity therein, said housing having an entrance port connected to a source of fluid and an outlet port connected to a fluid system, said housing having a first seat and a second seat, said valve having a body connected to an actuation member for moving first and second poppets with respect to the first and second seats, respectively, to control the flow of fluid from the entrance port to the cavity and correspondingly the flow of fluid to the outlet port, said actuation member moving said body to terminate the flow of fluid to the outlet port by initially moving said second poppet into engagement with said second face to partially interrupt the flow of fluid through cavity and thereafter moving the first poppet into engagement with said first face to completely interrupt the flow of fluid through the cavity to the outlet port, the improvement in each of the first and second seats comprising:

a cylindrical member located in said cavity having a first end with a flange and a conical surface thereon, said conical surface defining the contact for the seating of one of said first and second poppets, said cylindrical member and housing having a defined radial clearance therebetween;

a flexible member of laminated graphite located in a groove in said housing, said flexible member engaging said cylindrical member, said flexible member possessing sufficient resiliency to compensate for any eccentricity in said housing by moving said cylindrical member within said radial clearance to assure that each of the first and second seats and first and second poppets retain their structural alignment relationship over a wide range of operating temperatures; and locking means having a ring that engages said flange and said housing to compress said flexible member and form a seal between said cylindrical member and said housing and to hold said cylindrical member in said housing, said ring having tabs that engage said housing to prevent said ring from rotating in said housing, said flexible member allowing dimensional changes to occur in said housing without effecting the flow of fluid through the cavity to the outlet port when the first and second poppets engage said first and second seats.

2. In the valve as recited in claim 1 wherein said locking means further includes;

a pin that engages housing to prevent said ring from rotating.

3. In the valve as recited in claim 1 wherein said first and second seats can be replaced should any wear occur on the conical surface that would effect the sealing with the first and second poppets.

4. In the valve as recited in claim 3 further including:

self aligning washers through which said actuator is connected to said body to assist in maintaining said first and second poppets in alignment with said first and second seats.

5. In the valve as recited in claim 1 wherein said locking means further includes:

tangs on said tabs that engage said housing to secure said ring in said housing.

6. In the valve as recited in claim 5 wherein said locking means further includes:

ribs located in said housing which correspond to said tabs on said ring, said tabs and ribs preventing said cylindrical body from moving axially within said bore during the flow of fluid to the outlet port.

* * * * *